(12) United States Patent
Leising et al.

(10) Patent No.: US 6,558,845 B1
(45) Date of Patent: May 6, 2003

(54) MIXED PHASE METAL OXIDE AND METHOD OF PREPARATION

(75) Inventors: Randolph A. Leising, Williamsville, NY (US); Esther S. Takeuchi, East Amherst, NY (US)

(73) Assignee: Wilson Greatbatch, Ltd., Clarence, NY (US)

( * ) Notice: Subject to any disclaimer, the term of this patent is extended or adjusted under 35 U.S.C. 154(b) by 0 days.

(21) Appl. No.: 09/439,872

(22) Filed: Nov. 12, 1999

Related U.S. Application Data

(63) Continuation-in-part of application No. 08/917,072, filed on Aug. 22, 1997, now abandoned.

(51) Int. Cl.[7] .................................................. H01M 4/58
(52) U.S. Cl. ..................................... 429/231.2; 429/219
(58) Field of Search ................................. 429/219, 220, 429/231.2, 231.5, 218.1

(56) References Cited

U.S. PATENT DOCUMENTS

| | | | |
|---|---|---|---|
| 4,310,609 A | 1/1982 | Liang et al. ................ 429/194 |
| 4,391,729 A | 7/1983 | Liang et al. ............. 252/182.1 |
| 5,221,453 A | 6/1993 | Crespi ........................ 204/291 |
| 5,435,874 A | 7/1995 | Takeuchi et al. ............ 156/242 |
| 5,472,810 A | 12/1995 | Takeuchi et al. ............ 429/218 |
| 5,498,494 A | 3/1996 | Takeuchi et al. ............ 429/219 |
| 5,516,340 A | 5/1996 | Takeuchi et al. .............. 29/623 |
| 5,545,497 A | 8/1996 | Takeuchi et al. ............. 429/219 |
| 5,670,276 A | * 9/1997 | Takeuchi et al. ............. 429/219 |
| 5,716,422 A | 2/1998 | Muffoletto et al. ......... 29/623.5 |
| 5,895,733 A | * 4/1999 | Crespi et al. ................ 429/219 |
| 5,955,218 A | * 9/1999 | Crespi et al. ................ 429/219 |

FOREIGN PATENT DOCUMENTS

| EP | 0478303 | 9/1990 |
|---|---|---|
| EP | 0618630 A1 | 3/1994 |

OTHER PUBLICATIONS

Leising, R.A.: Takeuchi, E.S. Chem Matr. 1994, 6, 489–495 "Solid–State Synthesis and Characterization of Silver Vanadium Oxide For Use As a Cathode Material for Lithium Batteries." Not month available.

* cited by examiner

Primary Examiner—Patrick Ryan
Assistant Examiner—R Alejandro
(74) Attorney, Agent, or Firm—Michael F. Scalise

(57) ABSTRACT

The present invention is related to an electrochemical cell comprising an anode of a Group IA metal and a cathode of a mixed phase metal oxide prepared from a combination of starting materials comprising vanadium oxide and a mixture of at least one of a decomposable silver-containing constituent and a decomposable copper-containing constituent. The starting materials are mixed together to form a homogeneous admixture that is not further mixed once decomposition heating begins to form the product active material. The present cathode material is particularly useful for implantable medical applications.

12 Claims, 7 Drawing Sheets

MIXED PHASE METAL OXIDE AND METHOD OF PREPARATION

CROSS-REFERENCE TO RELATED APPLICATION

The present application is a continuation-in-part application of Ser. No. 08/917,072, filed August 22, 1997 now abandoned.

BACKGROUND OF THE INVENTION

1. Field of the Invention

The present invention generally relates to the conversion of chemical.energy to electrical energy, and more particularly, to an alkali metal electrochemical cell having a positive electrode comprising a mixed phase metal oxide (MPO). Preferred mixed phase metal oxides include silver vanadium oxide, copper vanadium oxide and copper silver vanadium oxide present in various phases or stoichiometric formulations along with a minor amount of the starting materials.

2. Prior Art

Mixed metal oxides such as silver vanadium oxide are known for use as cathode active materials in electrochemical cells. U.S. Pat. No. 4,391,729 to Liang et al., which is assigned to the assignee of the present invention and incorporated herein by reference, describes a method of preparing a composite cathode material by thermally decomposing a vanadium salt such as ammonium metavanadate to produce vanadium pentoxide. The nitrate ore the nitrite of a second metal is then added to the vanadium pentoxide, thoroughly mixed therewith and heated to dryness. At the end of the initial drying period, the mixture is again stirred and ground to ensure homogeneity and subsequently baked for a minimum of 24 hours at 360° C. During the final heating/decomposition period, nitrogen oxide gases are evolved, and at specific time intervals after evolution of the nitrogen oxides, the admixture is stirred vigorously. The second metal is preferably selected from silver, copper, manganese and mixtures thereof typical product has the general formula $Ag_xV_2O_y$ wherein "x" is in the range from about 0.5 to about 2.0, and "y" is in the range from about 4.5 to about 6.0.

U.S. Pat. No. 5,516,340 to Takeuchi et al., which is assigned to the assignee of the present invention and incorporated herein by reference, describes the preparation of a metal oxide composite cathode material such as copper silver vanadium oxide using various starting materials including vanadium oxide combined with the nitrate or the nitrite of a second and a third metal. The reactants are thoroughly mixed together and then baked. The baking protocol calls for a gradual increase in the heating temperature up to a decomposition temperature accompanied by periodic stirring. A final grinding and heating step takes place at 375° C. Further, U.S. Pat. No. 5,221,453 to Crespi describes various silver vanadium oxide preparation techniques, for example, milling powdered $AgVO_3$ or powdered $Ag_2O$ with $V_2O_5$ and heating at 520° C.

The metal oxide materials produced according to the techniques described by Liang et al., Takeuchi et al. and Crespi result in an electrode active material, preferably a cathode active material, that is advantageous for use in implantable medical devices such as an implantable cardiac defibrillator and the like where the battery power source may run under a light, device monitoring load for extended periods of time interrupted by high rate pulse discharge during device activation. However, during pulse discharge, the occurrence of voltage delay is an undesirable characteristic of some metal oxide, materials, which may result in a shortened implantable device life. There is, therefore, the need for a metal oxide cathode material that provides all the advantages of the previously discussed metal oxide cathode materials, but which additionally exhibits increased discharge capacity and decreased voltage delay for pulse discharge applications. The present invention fulfills this need in a mixed phase metal oxide cathode material provided in a decomposition reaction wherein after the reactant starting materials or reactant constituents are initially combined into a homogeneous admixture, they are not further mixed during decomposition heating.

SUMMARY OF THE INVENTION

In lieu of preparation techniques calling for the mixing of the reactant constituents both before and during decomposition heating, the present invention is directed to mixed phase metal oxide active materials synthesized from a homogenous admixture of starting materials or reactant constituents that are not further mixed once decomposition heating begins. A homogeneous admixture is defined as a substantially identical distribution of the reactant starting materials or reactant constituents throughout the admixture prior to decomposition heating. The starting materials include both nitrate, nitrite, carbonate and ammonium salt materials mixed with at least one metal oxide. Thus, although the ratio and type of starting materials does not differ from the standard preparation of silver vanadium oxide according to the previously discussed patent to Liang et al., the resulting mixed phase metal oxide active materials have an increased ability for the intercalation and deintercalation of metal ions produced by oxidation of the anode while minimizing the detrimental effects of voltage delay.

Additionally, the present preparation techniques provide active materials with increased energy density which is an unexpected result.

These and other aspects of the present invention will become more apparent to those skilled in the art by reference to the following description and to the appended drawings.

DETAILED DESCRIPTION OF THE PREFERRED EMBODIMENTS

Figure 1:
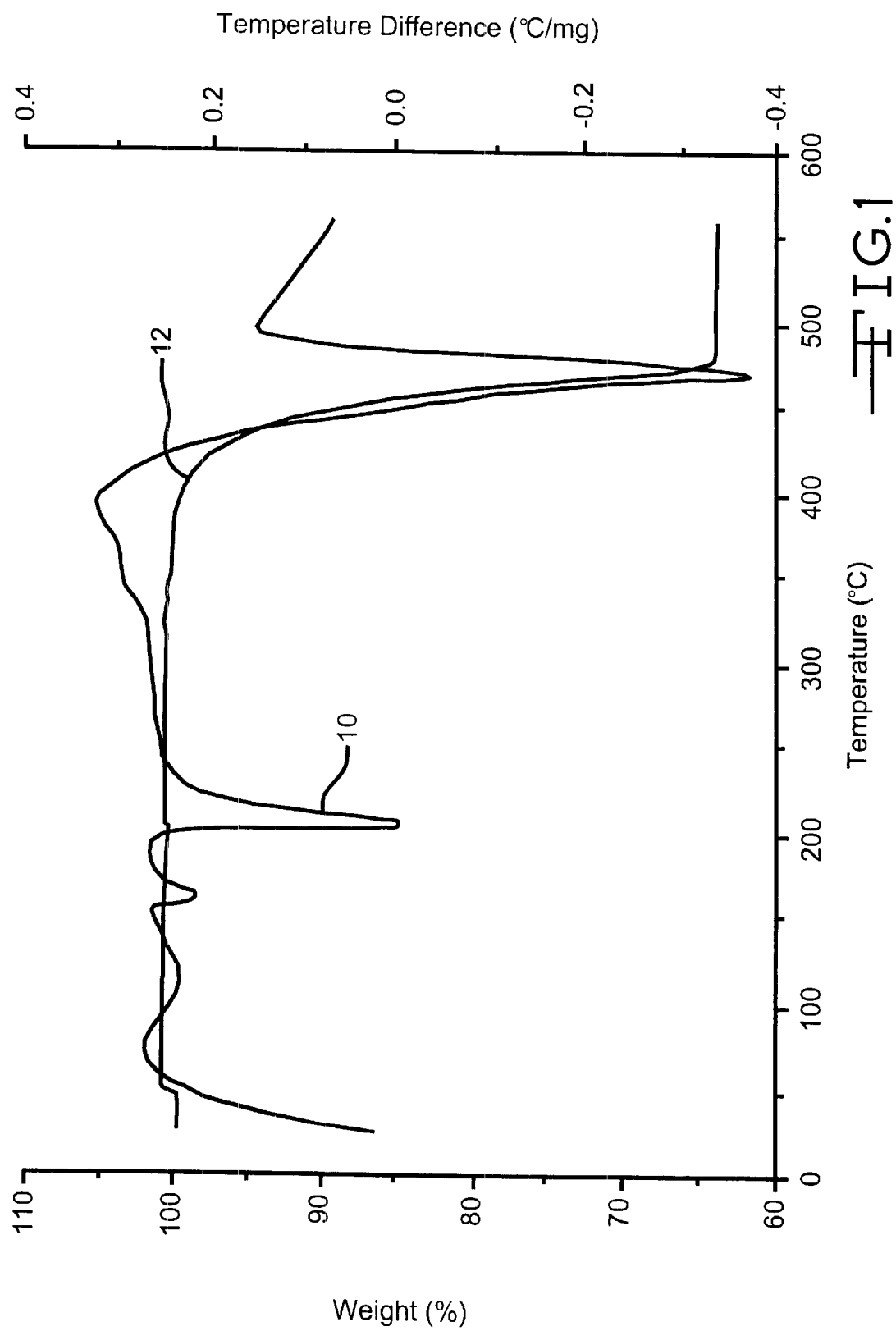
FIG. 1 is a graph constructed from the differential thermal analysis and thermal gravimetric analysis of silver nitrate.

An electrochemical cell including a mixed phase metal oxide synthesized as an electrode active material such as a cathode active material according to the present invention preferably comprises an anode of a metal selected from Group IA of the Periodic Table of the Elements. This group of metals is collectively referred to as the alkali metals and comprises lithium, sodium, potassium, etc., and their alloys and intermetallic compounds including, for example, Li-Si, Li-Al, Li-B and Li-Si-B alloys and intermetallic compounds. The preferred anode comprises lithium. An alternate anode comprises a lithium alloy, such as a lithium-aluminum alloy. The greater the amount of aluminum present by weight in the alloy, the lower the energy density of the cell.

The form of the anode may vary, but preferably the anode is a thin metal sheet or foil of the anode metal, pressed or rolled on a metallic anode current collector, i.e., preferably comprising nickel, to form an anode component. In the exemplary cell of the present invention, the anode component has an extended tab or lead of the same material as the anode current collector, i.e., preferably nickel, integrally formed therewith such as by welding and contacted by a weld to a cell case of conductive metal in a case-negative electrical configuration. Alternatively, the anode may be formed in some other geometry, such as a bobbin shape, cylinder or pellet to allow an alternate low surface cell design.

The electrochemical reaction at the cathode involves conversion of ions which migrate from the anode to the cathode into atomic or molecular forms. The cathode material of the present invention comprises at least a first cathode active constituent formed from readily decomposable reactant constituent compounds consisting of metals from Groups IB, IIB, IIIB, IVB, VB, VIB, VIIB, as well as from Group VIII which are mixed together in a substantially homogeneous admixture and subsequently thermally treated so as to effect the rapid preparation of suitable mixed phase metal oxide cathode materials. The thermal decomposition heating occurs in an oxygen-containing atmosphere such as air or oxygen and at a temperature dictated by the constituent compounds making up the admixture. Such decomposable reactant constituents include, but are not limited to, those classes of compounds known as nitrates, nitrites, carbonates and ammonium salts. At such time as the heating temperature reaches the decomposition temperature of the mixture, the mixture comprising the nitrates, nitrites and ammonium salt compounds is characterized by the evolution of nitrogen oxide gas. A mixture containing carbonate compounds is characterized by the evolution of carbon dioxide. The decomposable reactant compounds may also comprise a metal sulfide instead of the decomposable nitrates, nitrites and carbonates.

Preferred mixed phase metal oxides are prepared by thoroughly mixing vanadium oxide with a metal, a metal oxide or a decomposable metal compound of a second metal and possibly a third metal, wherein at least one of the second and third metals are of a decomposable compound. Vanadium oxide is most preferredly in the form $V_2O_5$. This homogeneous admixture, having a substantially identical distribution of the reactant constituents throughout, is thereafter reacted in a thermal decomposition reaction to form the resulting mixed phase metal oxide. The second and third metals are most preferably selected from silver, copper and manganese. An important aspect of the present invention is that the substantially homogeneous admixture is not further mixed once decomposition heating commences. However, it should be pointed out that the mixture of the decomposable reactant constituent compounds can be heated and stirred or ground prior to the heating temperature reacting the decomposition temperature without departing from the scope of the present invention.

Table 1 below lists a summary of thermal analysis data for various ones of the starting materials of the present invention.

TABLE 1

|  | Melting Point | Decomposition Starts |
| --- | --- | --- |
| Silver Nitrate | 212° C. | 444° C. |
| Silver Carbonate | 218° C. (d.) | — |
| Silver Nitrite | 140° C. (d.) | — |
| Copper Nitrate | 114.5° C. | —HNO$_3$, 170° C. |
| Copper Carbonate | 200° C.–220° C. | — |
| Manganese Nitrate | 25.8° C. | 129.4° |
| Manganese Carbonate | (d.) | — |
| Silver Sulfide (acanthite) | tr. 175° C. | d. |
| Copper (II) Sulfide (covellite) | 103° C. | 220° C. (d.) |
| Manganese Sulfide | d. | — |
| Vanadium Oxide | 690° C. | 1,750° C. |
| Ammonium Metavanadate | d. | — |

(d.) - decomposes
(tr.) - transition point

Table 2 below lists a summary of the thermal analysis data for various mixtures of the starting materials set forth in Table 1.

TABLE 2

|  | Mole Ratio | Melting Point | Decomposition Starts |
| --- | --- | --- | --- |
| Silver Nitrate + Vanadium Oxide | 1:1 | 207° C. | 280° C. |
| Silver Carbonate + Vanadium Oxide | 1:1 | 190° C. (d.) | — |
| Silver Nitrite + Vanadium Oxide | 1:1 | 108° C. (d.) | — |
| Copper Nitrate + Vanadium Oxide | 1:1 | 82° C. | 117° C. |
| Copper Carbonate + Vanadium Oxide | 1:1 | 287° C. (d.) | — |
| Silver Nitrate, Copper Nitrate + Vanadium Oxide | 1:1:1 | 82° C. | –200° C. |

(d.) - decomposes
(tr.) - transition point

A preferred mixed phase metal oxide according to the present invention is provided by thoroughly mixing silver nitrate with vanadium pentoxide, which admixture is not further mixed once heating to the decomposition temperature is reached.

Equation I below represents the heating of silver nitrate and vanadium oxide at about 207° C. when the silver nitrate material begins to melt, but before the decomposition reaction.

At 207° C.: $AgNO_3 + V_2O_5 \rightarrow AgNO_3 \text{(liq)} + V_2O_5$     (I)

The decomposition of silver nitrate in a mixture with vanadium pentoxide, with accompanying weight loss, begins at about 280° C., which is a much lower temperature than the temperature at which pure silver nitrate decomposes, i.e., at about 444° C. The decomposition of silver nitrate results in the formation of silver vanadium oxide and $NO_x$ gas.

Equation II below represents the decomposition reaction of silver nitrate and vanadium oxide at about 280° C.

At 280° C.: $AgNO_3 \text{(liq)} + V_2O_5 \rightarrow AgV_2O_{5.5} + NO_x$     (II)

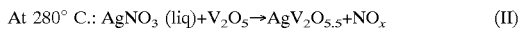

Figure 2:
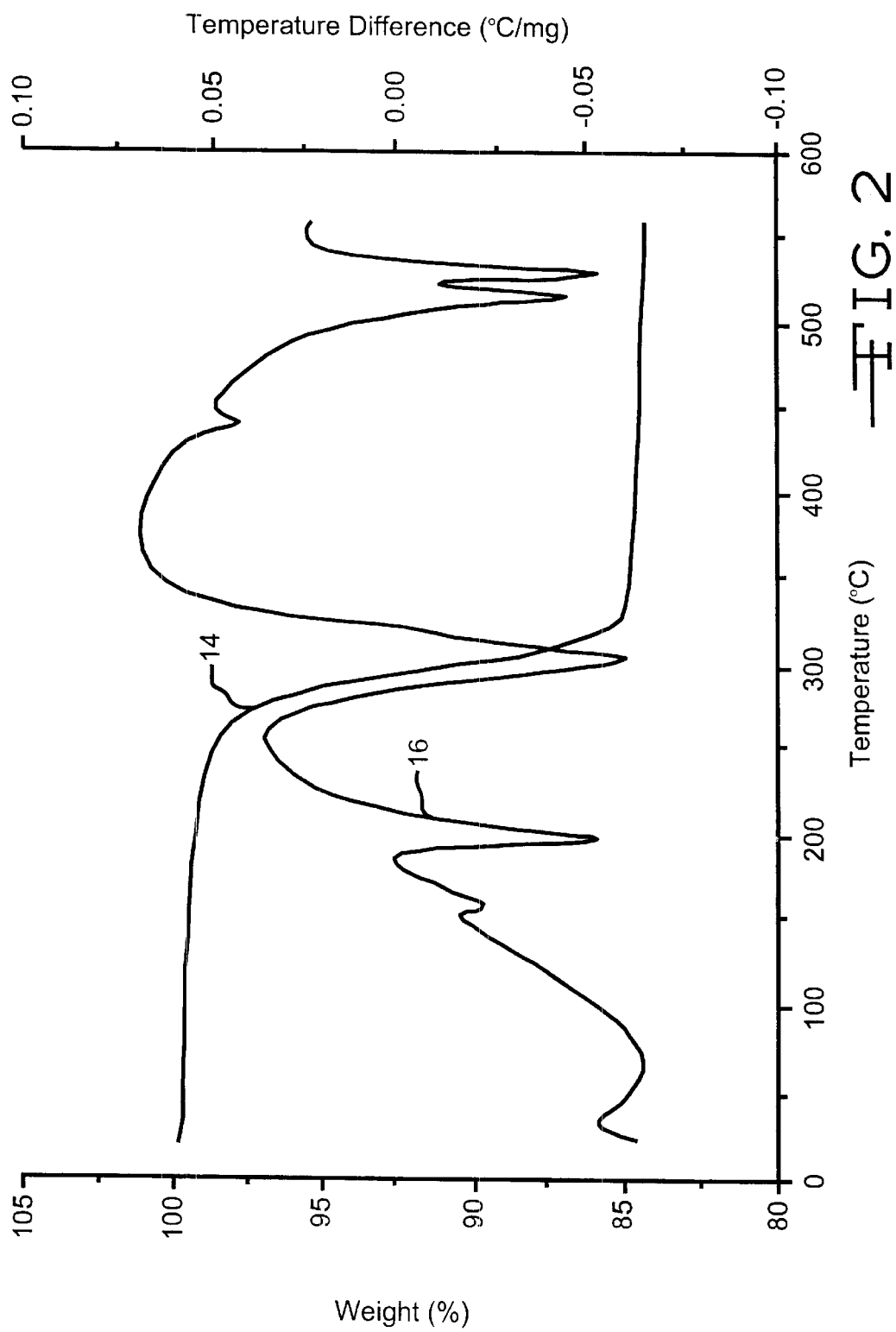
FIG. 2 is a graph constructed from the differential thermal analysis and thermal gravimetric analysis of a mixture of silver nitrate and vanadium oxide.

The preparation of silver vanadium oxide according to the present invention from a mixture of silver nitrate and vanadium oxide is illustrated in FIGS. 1 and 2. In FIG. 1 the melting point of silver nitrate is about 212° C., as indicated by the endotherm in the differential thermal analysis (DTA) curve 10. No weight loss is noted at this temperature in the thermal gravametric analysis (TGA) curve 12. Weight loss begins at about 444° C., i.e., at commencement of the decomposition reaction as evidenced by the evolution of $NO_x$ gas, corresponding to the large endothermic transition in the silver nitrate DTA curve 10 at that temperature. The TGA curve 14 for a mixture of silver nitrate and vanadium pentoxide is shown in FIG. 2. This mixture melts at about 207° C., as shown by the endothermic transition in the DTA curve 16 at this temperature.

According to the present invention, any one of the decomposable starting materials are mixed together in a substantially homogeneous admixture and subsequently thermally treated to provide the novel mixed phase metal oxide cathode active material. Thus, the present thermal decomposition heating occurs in an oxygen-containing atmosphere and at a temperature of about 81° C. to about 290° C. depending on the starting material constitutes. The exact temperature at which decomposition begins is dictated by the starting materials. For a mixture of silver nitrate and vanadium oxide, mixing does not occur once the heating temperature reaches about 279° C. Mixing does not occur once a mixture of silver carbonate and vanadium oxide reaches about 189° C. and for a mixture of silver nitrite and vanadium oxide, once heating reaches about 107° C. For a mixture of copper nitrate and vanadium oxide, all mixing ceases once the heating temperature reaches about 81° C. and for copper carbonate and vanadium oxide, once heating reaches about 286° C.

Those skilled in this art will readily recognize that various combinations of nitrates, nitrites, carbonates, sulfides and ammonium salts not listed in Table 2 are useful for preparation of mixed phase metal oxides according to the present invention. These include, but are not limited to, manganese nitrate and vanadium oxide; manganese carbonate and vanadium oxide; manganese nitrite and vanadium oxide; silver sulfide and vanadium oxide; copper(II) sulfide and vanadium oxide; manganese sulfide and vanadium oxide; silver nitrate, manganese nitrate and vanadium oxide; copper nitrate, manganese nitrate and vanadium oxide; silver carbonate, copper carbonate and vanadium oxide; silver carbonate, manganese carbonate and vanadium oxide; copper carbonate, manganese carbonate and vanadium oxide; silver nitrate, copper nitrate and vanadium oxide; silver nitrate, manganese nitrite and vanadium oxide; copper nitrate, manganese nitrate and vanadium oxide; silver sulfide, copper(II) sulfide and vanadium oxide; silver sulfide, manganese sulfide and vanadium oxide; copper sulfide, manganese sulfide and vanadium oxide; silver sulfide, copper nitrates and vanadium oxide; silver sulfide, copper nitrite and vanadium oxide; silver sulfide, copper carbonate and vanadium oxide; silver nitrate, copper sulfide and vanadium oxide; silver nitrate, copper sulfide and vanadium oxide; silver carbonate, copper sulfide and vanadium oxide; silver sulfide, manganese nitrate and vanadium oxide; silver sulfide, manganese nitrite and vanadium oxide; silver sulfide, manganese carbonate and vanadium oxide, and combinations and mixtures thereof.

Those skilled in the art will also understand that Table 2 lists the various reactants in 1:1 mole ratios and their corresponding melting point and decomposition temperature. However, the mole ratio can be changed which will consequently change the melting point and decomposition temperature of the resulting mixtures.

One preferred mixed phase metal oxide substantially comprises an active material having the general formula $SM_xV_2O_y$ wherein SM is a metal selected from Groups IB to VIIB and VIII of the Periodic Table of Elements and wherein x is about 0.30 to 2.0 and y is about 4.5 to 6.0 in the general formula. By way of illustration, and in no way intended to be limiting, one exemplary mixed phase cathode active material substantially comprises silver vanadium oxide (SVO) having the general formula $Ag_xV_2O_y$ in at least one of its many phases, i.e., P-phase silver vanadium oxide having in the general formula x=0.35 and y=5.8, γ-phase silver vanadium oxide having in the general formula x=0.74 and y=5.37 and ε-phase silver vanadium oxide having in the general formula x=1.0 and y=5.5, and combination and mixtures of phases thereof. In the mixed phase metal oxide product, there may also be present a minor amount of the reactant constituents, particularly the decomposable metal compound in a undecomposed state.

The preparation technique of a mixed phase metal oxide according to the present invention produces an active material displaying increased capacity and decreased voltage delay in comparison to $AgV_2O_{5.5}$ (SVO) prepared using a decomposition synthesis from $AgNO_3$ and $V_2O_5$ starting materials, such as is disclosed in the previously referenced U.S. Pat. No. 4,391,729 to Liang et al. The discharge capacity and decreased voltage delay of the mixed phase metal oxide of the present invention is also an improvement over that of SVO typically prepared from $Ag_2O$ and $V_2O_5$ by a chemical addition reaction such as is described in U.S. Pat. No. 5,498,494 to Takeuchi et al., which is assigned to the assignee of the present invention and incorporated herein by reference.

Advantages of the use of this mixed phase material include increased capacity and decreased voltage delay for pulse discharge applications. An example of such an application is the implantable cardiac defibrillator, where the battery may run under a light load for extended periods of time interrupted by high rate pulse discharge. The occurrence of voltage delay under these conditions is detrimental in that it may shorten device life.

Another preferred mixed phase composite cathode material is prepared from a homogeneous admixture of vanadium oxide and a second decomposable metal compound, metal or metal oxide and a third decomposable metal compound, metal or metal oxide wherein at least one of the second and third metal constituents is a decomposable form of silver and copper. According to the present invention, the homogeneous admixture is formed from $V_2O_z$ wherein $z \leq 5$ combined with a mixture of either copper nitrate, copper nitrite or an ammonium salt of copper and a silver oxide or, a mixture of copper oxide and silver nitrate, silver nitrite or an ammonium salt of silver to provide the mixed phase metal oxide having the formula $Cu_xAg_yV_2O_z$ (CSVO), preferably with $x \leq y$. In this preparation technique, the oxide starting materials may include $Ag_2O_z$ wherein z=2 to 1 and $CuO_z$ wherein z=0 to 1. Thus, this composite cathode active material may be described as a metal-metal oxide-metal oxide, or a metal-metal-metal oxide and the range of material compositions found for $Cu_xAg_yV_2O_z$ is preferably about $0.01 \leq x \leq 1.0$, about $0.01 \leq y \leq 1.0$ and about $5.01 \leq z \leq 6.5$. Another embodiment of the present invention has vanadium oxide combined with both a decomposable compound of silver and copper. Typical forms of CSVO are $Cu_{0.16}Ag_{0.67}V_2O_z$ with z being about 5.5 and $Cu_{0.5}Ag_{0.5}V_2O_z$ with z being about 5.75. U.S. Pat. Nos. 5,472,810 to Takeuchi et al. and 5,516,340 to Takeuchi et al. describe the prior art preparation of CSVO.

The above described active materials are formed into an electrode for incorporation into an electrochemical cell by mixing one or more of them with a conductive additive such as acetylene black, carbon black and/or graphite. Metallic powders such as nickel, aluminum, titanium and stainless steel in powder form are also useful as conductive diluents when mixed with the above listed active materials. The cathode electrode further comprises a binder material which is preferably a fluoro-resin powder such as powdered polytetrafluoroethylene (PTFE) or powdered polyvinylidene fluoride (PVDF). More specifically, a preferred mixed phase cathode active material comprises SVO in any one of its many phases, or.mixtures thereof, and/or CSVO along with a minor amount of the decomposable reactants mixed with a binder material and a conductive diluent.

A preferred cathode active admixture comprises from about 80% to 99%, by weight, of a cathode active material comprising either one or both of the mixed phase SVO and CSVO materials prepared according to the decomposition techniques of the present invention and mixed with a suitable binder and a conductive diluent. The resulting blended cathode active mixture may be formed into a free-standing sheet prior to being contacted with a current collector to form the cathode electrode. The manner in which the cathode active mixture is prepared into a free-standing sheet is thoroughly described in U.S. Pat. No. 5,435,874 to Takeuchi et al., which is assigned to the assignee of the present invention and incorporated herein by reference. Further, cathode components for incorporation into an electrochemical cell may also be prepared by rolling, spreading or pressing the mixed phase cathode active mixture of the present invention onto a suitable current collector. Cathodes prepared as described above may be in the form of one or more plates operatively associated with at least one or more plates of anode material, or in the form of a strip wound with a corresponding strip of anode material in a structure similar to a "jellyroll".

In order to prevent internal short circuit conditions, the cathode of the present invention is separated from the Group IA anode material by a suitable separator material. The separator is of electrically insulative material, and the separator material also is chemically unreactive with the anode and cathode active materials and both chemically unreactive with and insoluble in the electrolyte. In addition, the separator material has a degree of porosity sufficient to allow flow therethrough of the electrolyte during the electrochemical reaction of the cell. Illustrative separator materials include woven and non-woven fabrics of polyolefinic fibers or fluoropolymeric fibers including polyvinylidine fluoride, polyethylenetetrafluoroethylene, and polyethylenechlorotrifluoroethylene laminated or superposed with a polyolefinic or a fluoropolymeric microporous film. Suitable microporous films include a polytetrafluoroethylene membrane commercially available under the designation ZITEX (Chemplast Inc.), polypropylene membrane commercially available under the designation CELGARD (Celanese Plastic Company, Inc.) and a membrane commercially available under the designation DEXIGLAS (C.H. Dexter, Div., Dexter Corp.). The separator may also be composed of non-woven glass, glass fiber materials and ceramic materials.

The electrochemical cell of the present invention further includes a nonaqueous, ionically conductive electrolyte which serves as a medium for migration of ions between the anode and the cathode electrodes during the electrochemical reactions of the cell. The electrochemical reaction at the electrodes involves conversion of ions in atomic or molecular forms which migrate from the anode to the cathode.

Thus, nonaqueous electrolytes suitable for the present invention are substantially inert to the anode and cathode materials, and they exhibit those physical properties necessary for ionic transport, namely, low viscosity, low surface tension and wettability.

A suitable electrolyte has an inorganic or organic, ionically conductive salt dissolved in a nonaqueous solvent, and more preferably, the electrolyte includes an ionizable alkali metal salt dissolved in a mixture of aprotic organic solvents comprising a low viscosity solvent and a high permittivity solvent. The ionically conductive salt serves as the vehicle for migration of the anode ions to intercalate or react with the cathode active material. Preferably the ion-forming alkali metal salt is similar to the alkali metal comprising the anode.

In a solid cathode/electrolyte system, the ionically conductive salt preferably has the general formula $MM'F_6$ or $MM'F_4$ wherein M is an alkali metal similar to the alkali metal comprising the anode and M' is an element selected from the group consisting of phosphorous, arsenic, antimony and boron. Examples of salts yielding $M'F_6$ are: hexafluorophosphate ($PF_6$), hexafluoroarsenate ($AsF_6$) and hexafluoroantimonate ($SbF_6$), while tetrafluoroborate ($BF_4$) is exemplary of salts yielding $M'F_4$. Alternatively, the corresponding sodium or potassium salts may be used. Other inorganic salts useful with the present invention include $LiClO_4$, $LiO_2$, $LiAlCl_4$, $LiGaCl_4$, $LiC(SO_2CF_3)_3$, $LiN(SO_2CF_3)_2$, $LiSO_3F$, $LiB(C_6H_5)_4$ and $LiCF_3SO_3$, and mixtures thereof.

Low viscosity solvents include tetrahydrofuran (THF), methyl acetate (MA), diglyme, trigylme, tetragylme, dimethyl carbonate (DMC), 1,2-dimethoxyethane (DME), diethyl carbonate and mixtures thereof, and high permittivity solvents include cyclic carbonates, cyclic esters and cyclic amides such as propylene carbonate (PC), ethylene carbonate (EC), acetonitrile, dimethyl sulfoxide, dimethyl formamide, dimethyl acetamide, γ-butyrolactone (GBL) and N-methyl-pyrrolidinone (NMP) and mixtures thereof. In the present invention, the preferred anode is lithium metal and the preferred electrolyte is 1.0 M to 1.2 M $LiAsF_6$ or $LiPF_6$ in PC/DME.

The preferred form of the electrochemical cell is a case-negative design wherein the anode/cathode couple is inserted into a conductive metal casing such that the casing is connected to the anode current collector in a case-negative configuration, as is well known to those skilled in the art. A preferred material for the casing is titanium although stainless steel, mild steel, nickel-plated milled steel and aluminum are also suitable. The casing header comprises a metallic lid having a sufficient number of openings to accommodate the glass-to-metal seal/terminal pin feedthrough for the cathode electrode. The anode electrode is preferably connected to the case or the lid. An additional opening is provided for electrolyte filling. The casing header comprises elements having compatibility with the other components of the electrochemical cell and is resistant to corrosion. The cell is thereafter filled with the electrolyte solution described hereinabove and hermetically sealed such as by close-welding a stainless steel plug over the fill hole, but not limited thereto. The cell of the present invention can also be constructed in a case-positive design.

The following examples describe the manner and process of manufacturing an electrochemical cell according to the present invention, and they set forth the best mode contemplated by the inventors of carrying out the invention, but they are not to be construed as limiting.

EXAMPLE I

The synthesis of a mixed phase metal oxide (MPO) according to the present invention was accomplished using a homogeneous 1:1 mole ratio of silver nitrate ($AgNO_3$) and vanadium oxide ($V_2O_5$) reacted under an air atmosphere. The reaction was carefully controlled such that the reactants were only mixed prior to the thermal treatment of the material. Mixing or grinding of the components, as performed in the synthesis of standard or prior art SVO, i.e. as described in the previously discussed U.S. Pat. No. 4,391,729 to Liang et al., was excluded once the heating step of the present preparation reach about 279° C.

The resulting solid-state MPO product was used directly as the active material for the cathode mixture without further preparation. The MPO material was characterized by differential scanning calorimetry and displayed endothermic transitions at 466° C., 533° C., and 555° C. The transitions in the DSC curve indicate the presence of at least three metal oxide phases: $AgVO_3$, $AgV_2O_{5.5}$ (ϵ-phase), and $Ag_{0.74}V_2O_{5.37}$ (γ-phase). The existence of multiple phases is in agreement with the physical appearance of MPO, which is a mixture of orange particles with gray and brown particles.

EXAMPLE II

The MPO material prepared according to the present invention and SVO material prepared according to Liang et al. were incorporated into respective alkali metal electrochemical cells. The MPO and SVC cells were of a multiplate design using the respective cathode materials containing, by weight, 94% MPO or SVO, 3% polytetrafluoroethylene, 2% graphite, and 1% carbon black. The cathodes used Ti metal current collectors, and the total cathode surface area was about 80.6 $cm^2$. Lithium metal in contact with a Ni metal current collector was used as the anode material. The cathodes were separated from the lithium anode by a polypropylene separator. The cells were filled with 1M $LiAsF_6$ in. PC/DME electrolyte and hermetically sealed.

All of the test cells were subjected to constant current pulses of 1.5 Amps. The current pulses were applied in groups of four, each pulse lasting 10 seconds in duration, with 15 seconds of rest between pulses. Three separate test regimes were used to simulate actual use of the battery in an implantable cardiac defibrillator device. The test regimes differed only in the time period between pulse trains and the value of the constant resistance load placed on the cells throughout the test. In Test I, the cells were placed under a 17.4 kΩ load, and pulsed every two months. Test II had the cells discharged under a 60.4 kΩ load and pulsed every 4 months while Test III used a 100 kΩ load and the cells were pulsed every 6 months.

Figure 3:
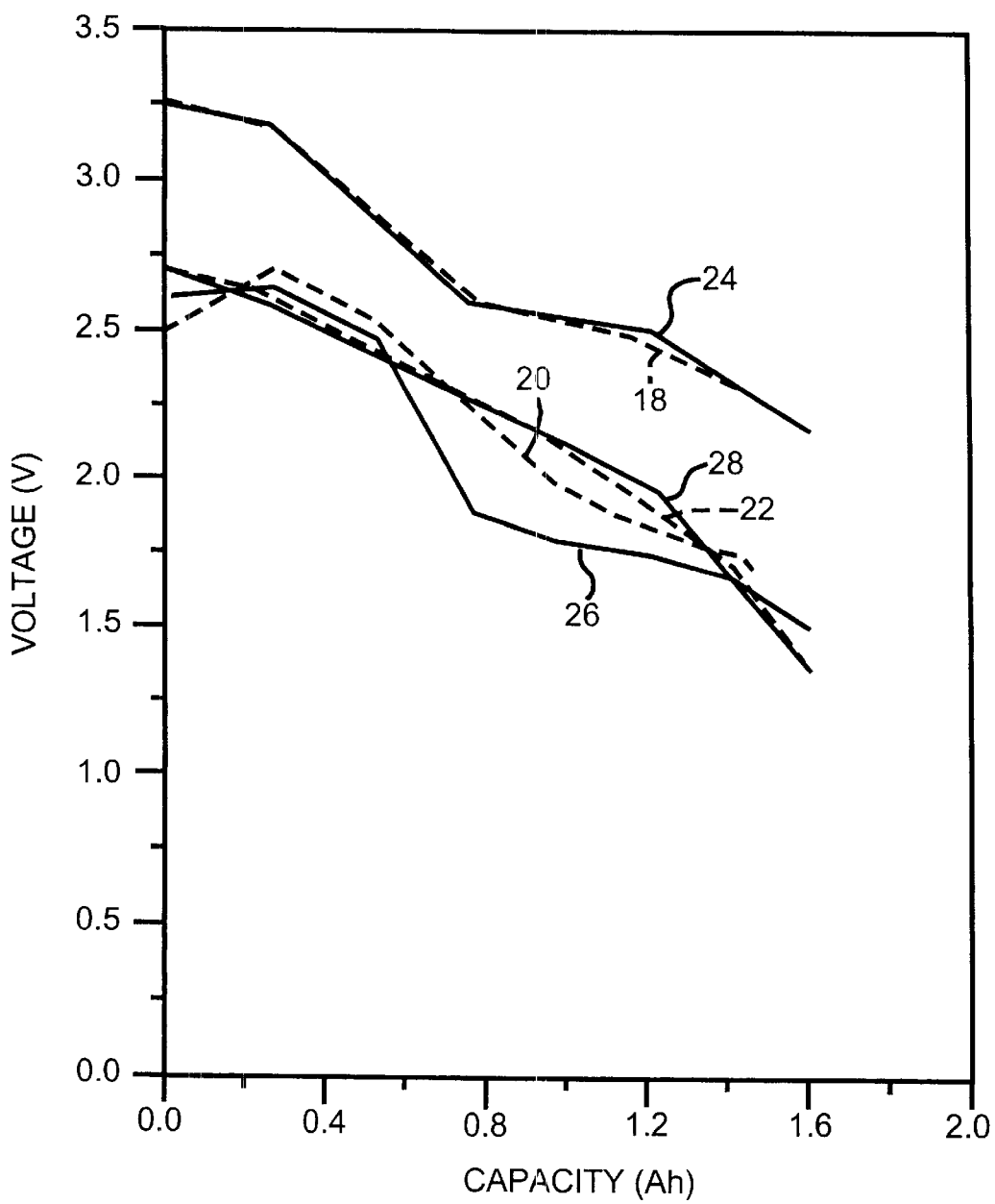
FIGS. 3 to 5 are graphs constructed from the discharge of lithium cells having a mixed phase silver vanadium oxide cathode prepared according to the present invention in comparison to lithium cells incorporating silver vanadium oxide synthesized according to the prior art decomposition preparation technique.
Figure 4:
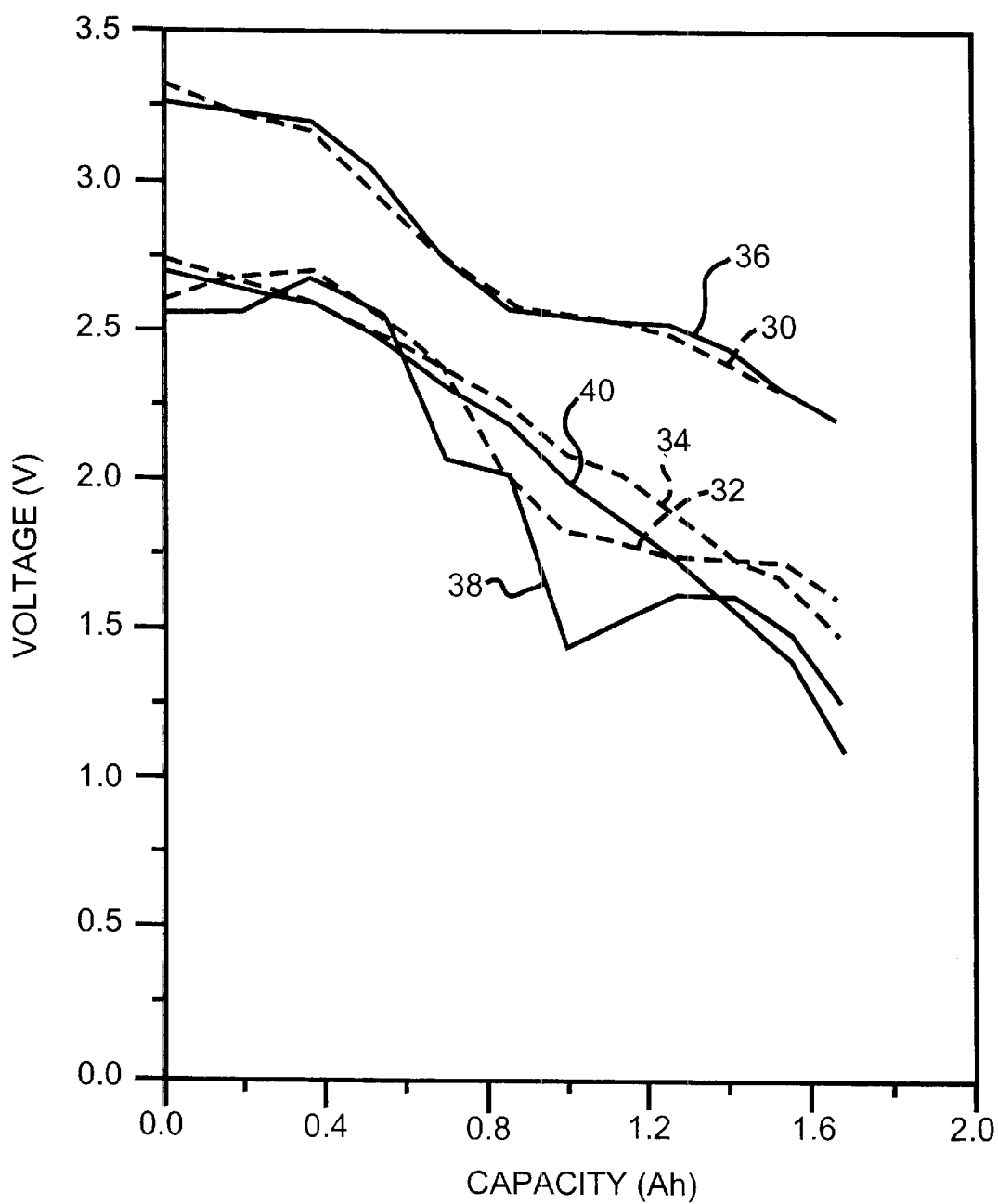
Figure 5:
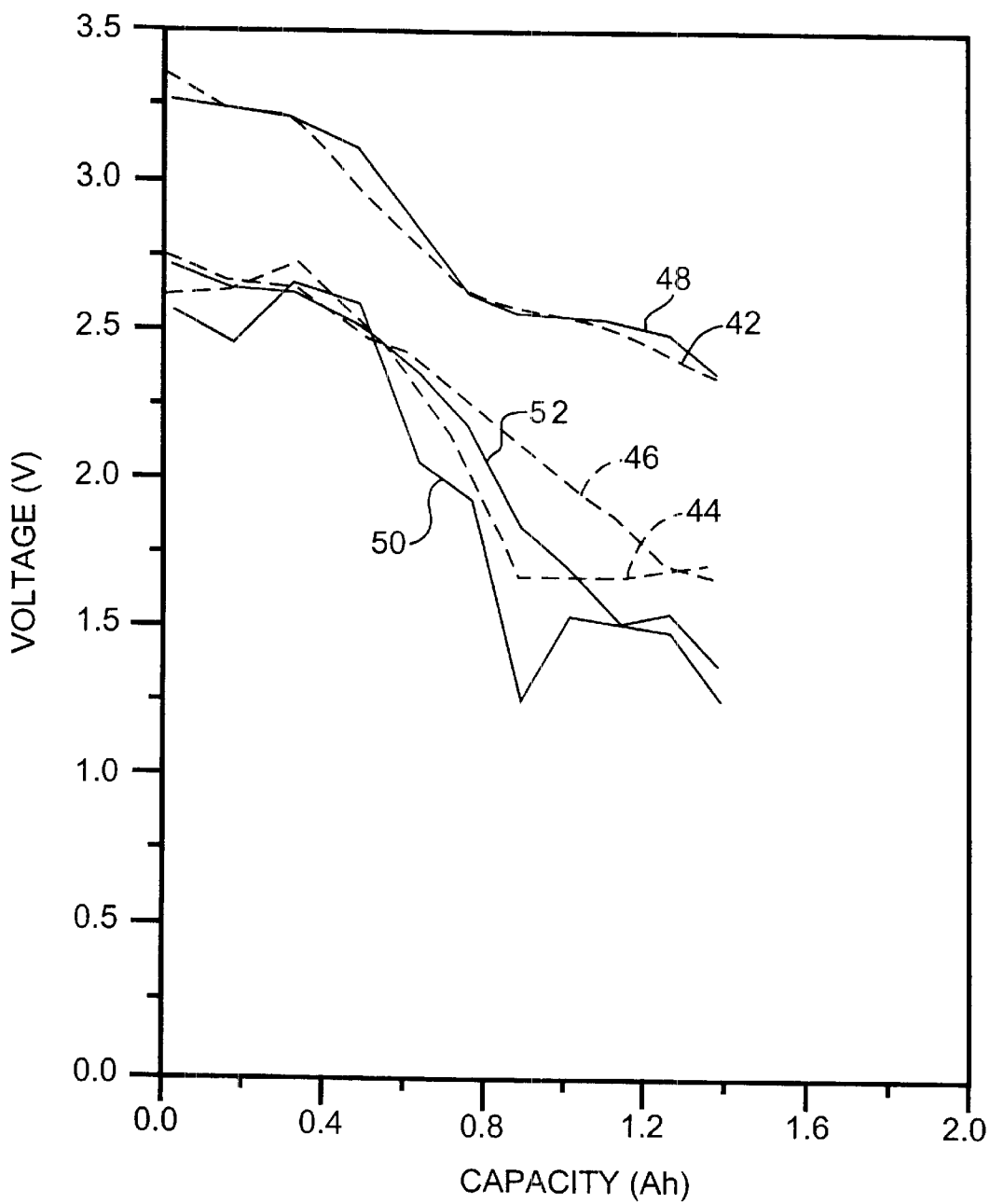

FIGS. 3 to 5 are graphs constructed from the results for the Li/MPO cells discharged under Tests I, II, III, respectively, in comparison to the results of the prior art Li/SVO cells discharged under the same tests. In particular, in FIG. 3, curve 18 was constructed from the background voltage of the Li/MPO cell discharged according to Test I, curve 20 was constructed from the P1 min. voltage of that cell and curve 22 was constructed from the P4 min. voltage. In comparison, in FIG. 3, curve 24 was constructed from the background voltage of the Li/SVO cell discharged according to Test I, curve 26 was constructed from the P1 min. voltage of that cell and curve 28 was constructed from the P4 min. voltage.

In FIG. 4, curve 30 was constructed from the background voltage of the Li/MPO cell discharged according to Test II, curve 32 was constructed from the P1 min. voltage of that cell and curve 34 was constructed from the P4 min. voltage. In comparison, in FIG. 4, curve 36 was constructed from the background voltage of the Li/SVO cell discharged according to Test II, curve 38 was constructed from the P1 min. voltage of that cell and curve 40 was constructed from the P4 min. voltage.

In FIG. 5, curve 42 was constructed from the background voltage of the Li/MPO cell discharged according to Test III, curve 44 was constructed from the P1 min. voltage of that cell and curve 46 was constructed from the P4 min. voltage. In comparison, in FIG. 5, curve 48 was constructed from the background voltage of the Li/SVO cell discharged according to Test III, curve 50 was constructed from the P1 min. voltage of that cell and curve 52 was constructed from the P4 min. voltage.

Voltage delay is indicated in these graphs by the occurrence of P1 min (minimum voltage of 1st current pulse) being lower than P4 min (minimum voltage of 4th current pulse). As can be seen in FIGS. 3 to 5, the present invention Li/MPO cells displayed less voltage delay than the comparable prior art Li/SVO cells, with this effect magnified as the time period between administration of the respective pulse trains increased from Test I to Test III. In addition, the Li/MPO cells provided higher pulse minimum voltages than the Li/SVO cells, thus resulting in increased capacity and longer battery life.

EXAMPLE III

A second group of cells constructed according to Example I but containing various ratios of MPO and SVO was discharged under a protocol referred to in house as three year accelerated discharge data (ADD). The three year ADD test consisted of placing the cells on a 60.4 kΩ background load at 37° C., and pulsing the cells with a pulse train once every 120 days. The pulse train consisted of four 1.5 Amp pulses of 10 seconds duration with 15 seconds of rest between pulses. The three year ADD test reached conclusion after 52 months. Selected pulse train discharge results are presented in Table 3 with the complete discharge data graphed in FIGS. 6 and 7.

TABLE 3

| Cathode | Bkgd V | Voltage (V) P1 min | P4 min |
|---|---|---|---|
| PULSE TRAIN #5 | | | |
| 100% MPO | 2.744 | 2.353 | 2.366 |
| 50% MPO/50% SVO | 2.736 | 2.366 | 2.350 |
| 100% SVO | 2.739 | 2.004 | 2.326 |
| PULSE TRAIN #7 | | | |
| 100% MPO | 2.557 | 1.811 | 2.117 |
| 50% MFO/50% SVO | 2.556 | 1.781 | 2.095 |
| 100% SVO | 2.554 | 1.485 | 2.008 |
| PULSE TRAIN #12 | | | |
| 100% MPO | 2.195 | 1.621 | 1.505 |
| 50% MPO/50% SVO | 2.196 | 1.548 | 1.455 |
| 100% SVO | 2.195 | 1.257 | 1.119 |

Figure 6:
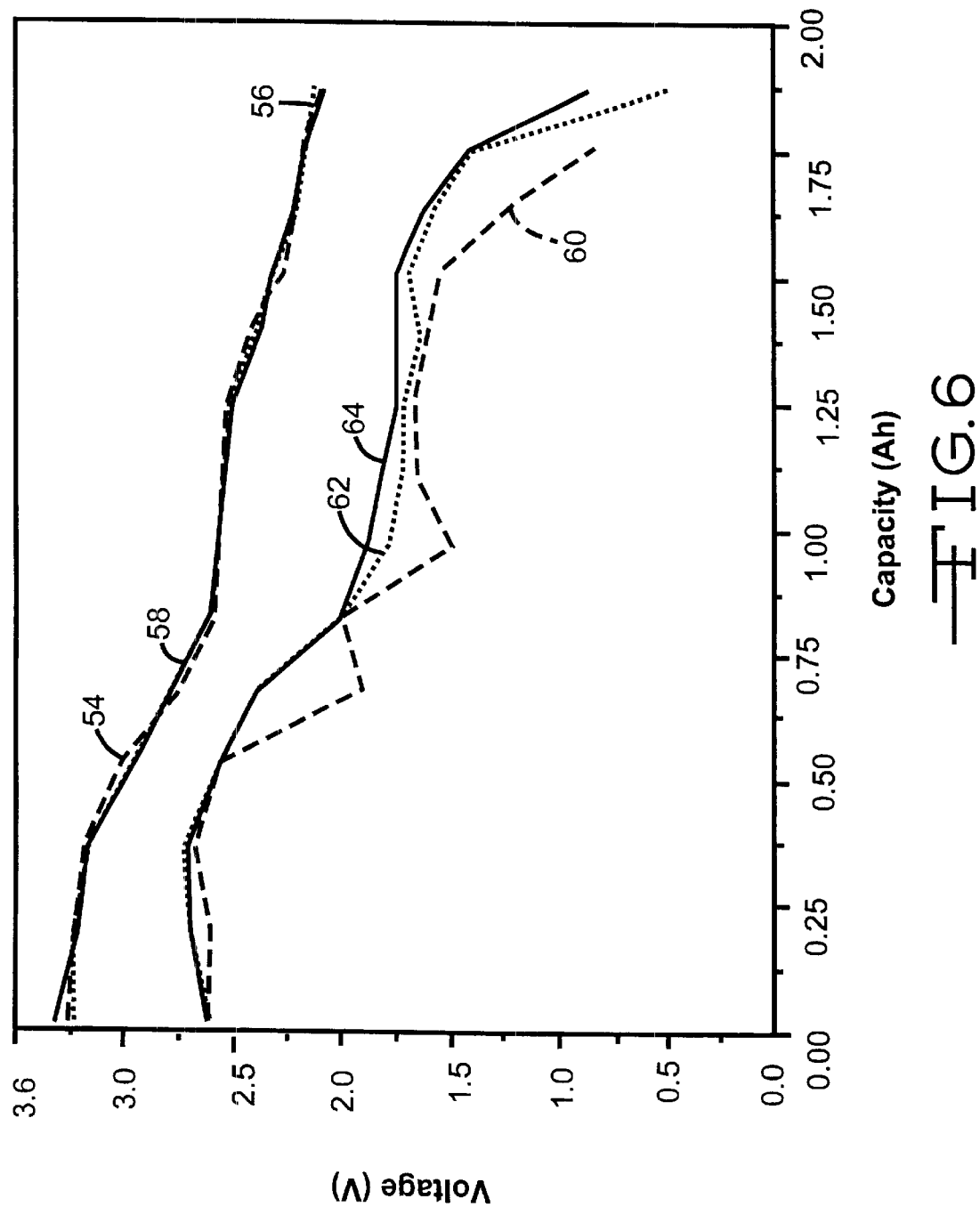
FIG. 6 is a graph constructed from the background voltages and P1 minima voltages of a Li/MPO cell of the present invention, a Li/SVO cell of the prior art and a cell having 50% SVO/50% MPO.
Figure 7:
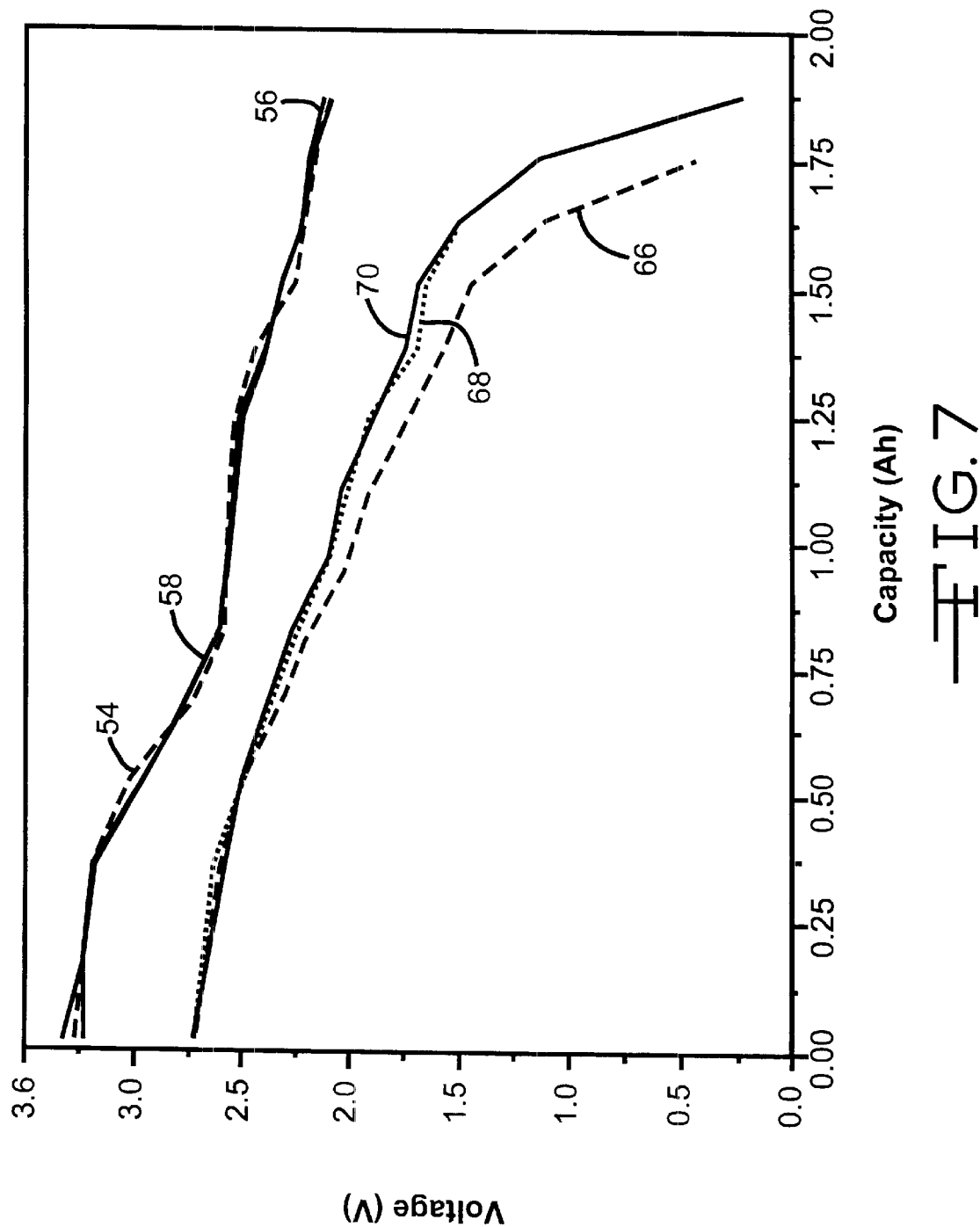
FIG. 7 is a graph constructed from the background voltages and P4 minima voltages of the cells used to construct the graph of FIG. 6.

In both FIGS. 6 and 7, the background voltage for the prior art Li/SVO cell is indicated by curve 54, the background voltage for the 50% SVO/50% MPO cell is indicated by curve 56 and the background voltage for the Li/MPO cell is indicated by curve 58. FIG. 6 also shows the respective curves for P1 minima of those cells wherein curve 60 was constructed from the Li/SVO cell, curve 62 was constructed from the 50% SVO/50% MPO cell and curve 64 was constructed from the Li/MPO cell. The Li/MPO cell performed better than the Li/SVO cell and the 50% SVO/50% MPO cell throughout the entire discharge life of the cells. In FIG. 7, the respective curves for P4 minima are shown for the tested cells wherein curve 66 was constructed from the Li/SVO cell, curve 68 was constructed from the 50% SVO/50% MPO cell and curve 70 was constructed from the Li/MPO cell. Again, the Li/MPO cell performed equal to or better than the other cells.

As is evident from Table 3 and FIGS. 6 and 7, the cells containing the MPO cathode material yielded much higher pulse voltages than the SVO control cells on long term test. This results in a cell with significantly higher deliverable capacity.

It is appreciated that various modifications to the inventive concepts described herein may be apparent to those skilled in the art without departing from the spirit and scope of the present invention defined by the hereinafter claims.

What is claimed is:

1. An electrochemical cell having an anode, a cathode of electrically conductive material, and an ionically conductive electrolyte activating the anode and the cathode, wherein the electrically conductive material of the cathode is formed by a process consisting essentially of the sequential steps of:
   a) forming a substantially homogeneous mixture of vanadium oxide and silver nitrate, wherein the homogeneous mixture is formed at a mixing temperature below a decomposition temperature of the homogeneous mixture;
   b) heating the homogeneous mixture to the decomposition temperature without further mixing once heating to the decomposition temperature begins;
   c) cooling the thusly produced mixed phase metal oxide constituting the electrically conductive material; and
   d) contacting the electrically conductive material to a cathode current collector to form the cathode.

2. The electrochemical cell of claim 1 wherein the vanadium oxide has the formula $V_2O_z$ with $z \leq 5$.

3. The electrochemical cell of claim 1 wherein the homogeneous mixture consists of the silver nitrate and the vanadium oxide in a 1:1 mole ratio, and the decomposition temperature is about 280° C.

4. The electrochemical cell of claim 1 wherein the decomposition heating occurs in an oxygen-containing atmosphere.

5. The electrochemical cell of claim 1 wherein the mixed phase metal oxide substantially consists of an active material having the general formula $Ag_xV_2O_y$ and wherein $0.30 \leq x \leq 2.0$ and $4.5 \leq y \leq 6.0$.

6. The electrochemical cell of claim 1 wherein the cathode further comprises at least one of a binder material and a conductive additive.

7. The electrochemical cell of claim 6 wherein the binder material is a fluoro-resin powder.

8. The electrochemical cell of claim 6 wherein the conductive additive is selected from the group consisting of carbon, graphite powder, acetylene black and metallic powder selected from the group consisting of titanium, aluminum, nickel, stainless steel, and mixtures thereof.

9. The electrochemical cell of claim 1 wherein the anode is comprised of a Group IA metal.

10. The electrochemical cell of claim 1 wherein the electrolyte activating the anode and the cathode comprises an ion-forming alkali metal salt dissolved in a nonaqueous solvent.

11. The electrochemical cell of claim 10 wherein the alkali metal of the anode comprises lithium and the ion-forming alkali metal salt comprising the electrolyte is selected from the group consisting of $LiPF_6$, $LiAsF_6$, $LiSbF6$, $LiBF_6$, $LiClO_4$, $Li_2O$, $LiAlCl_4$, $LiGaCl_4$, $Li(SO_2CF_3)_3$, $LiN(SO_2CF_3)_2$, $LiSO_3F$, $LiB(C_6H_5)_4$, $LiCF_3SO_3$, and mixtures thereof.

12. The electrochemical cell of claim 10 wherein the nonaqueous solvent comprises an organic solvent selected from the group consisting of tetrahydrofuran, propylene carbonate, ethylene carbonate, dimethyl carbonate, diethyl carbonate, methyl acetate, acetonitrile, dimethyl sulfoxide, dimethyl formamide, dimethyl acetamide, γ-butyrolactone, N-methyl-pyrrolidinone, diglyme, triglyme, tetraglyme, 1,2-dimethoxyethane, and mixtures thereof.

* * * * *